Oct. 3, 1944.　　　J. M. SHOEMAKER　　　2,359,392
CONTROL DEVICE
Filed April 28, 1942　　　2 Sheets-Sheet 1
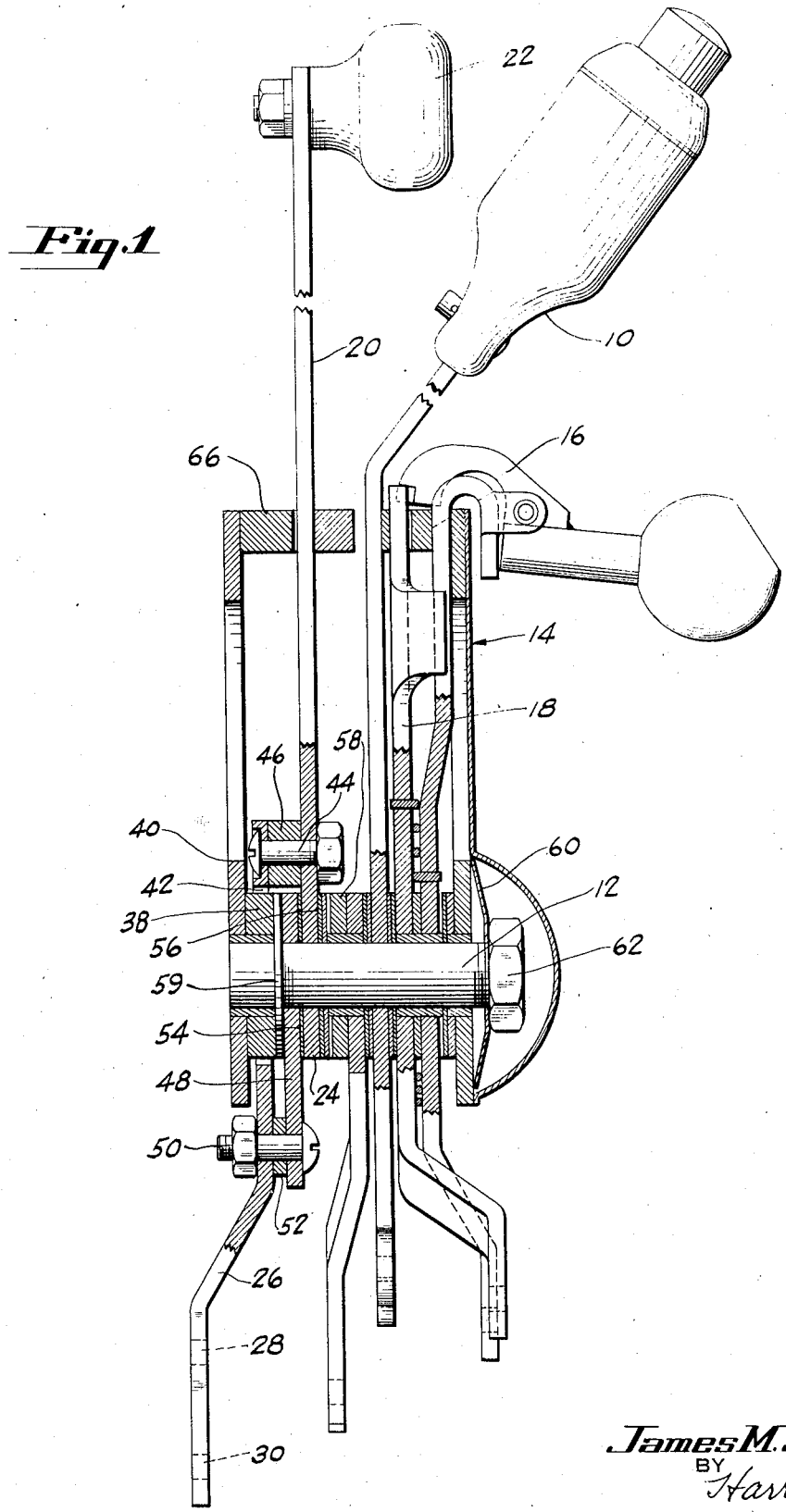
INVENTOR
James M. Shoemaker
BY
Harris G. Luther
ATTORNEY Oct. 3, 1944.   J. M. SHOEMAKER   2,359,392
CONTROL DEVICE
Filed April 28, 1942   2 Sheets-Sheet 2
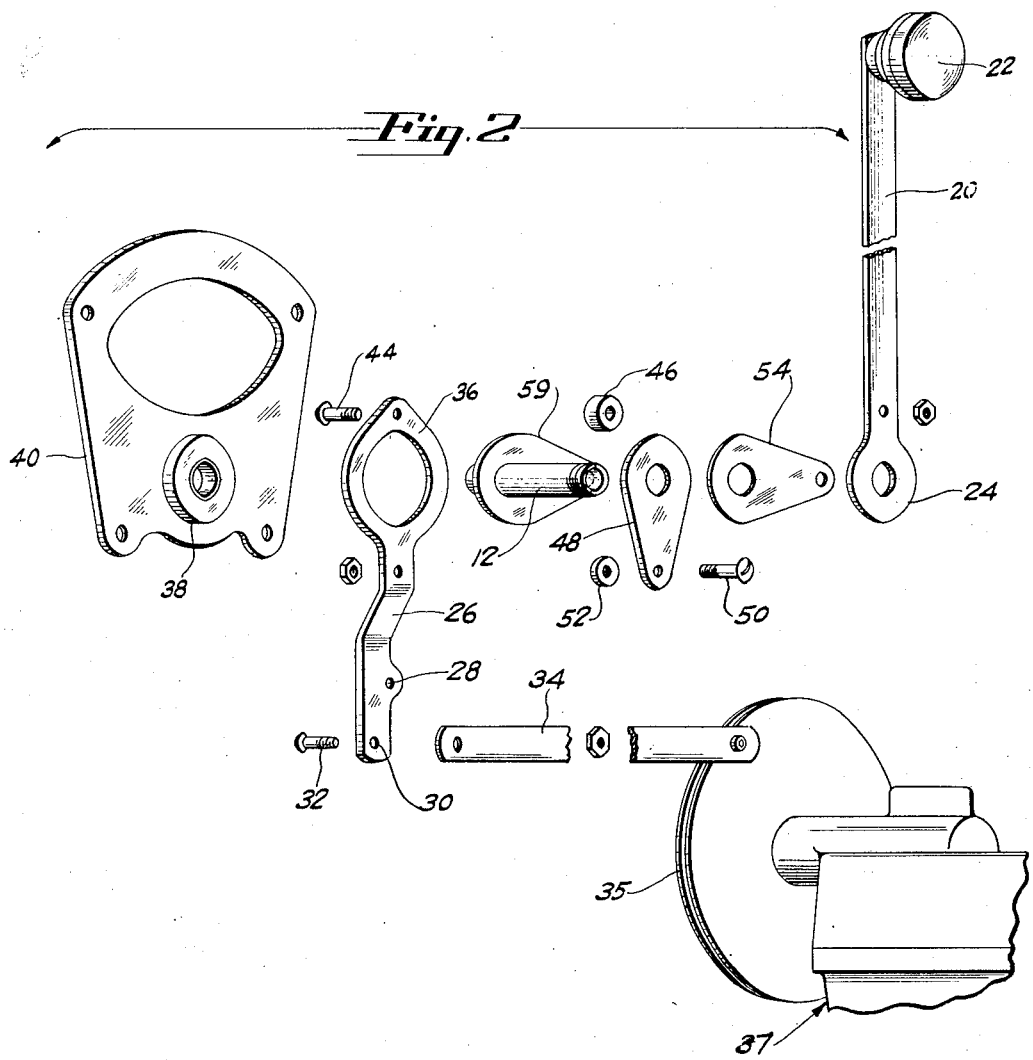
INVENTOR
James M. Shoemaker
BY Harris G. Luther
ATTORNEY Patented Oct. 3, 1944

2,359,392

UNITED STATES PATENT OFFICE 2,359,392

CONTROL DEVICE

James M. Shoemaker, Nichols, Conn., assignor to United Aircraft Corporation, East Hartford, Conn., a corporation of Delaware Application April 28, 1942, Serial No. 440,758

13 Claims. (Cl. 74—516)

This invention relates to improvements in manually operable control devices and has for an object the provision of such a device having a rapid motion for wide ranges of adjusting movement and a relatively slow motion for fine adjustment in a small range of adjusting movement.

A further object resides in the provision of a manual control or adjustment device of the character indicated including a lever member having two lever arms one of which can be used for large movements of the adjusting device and the other of which is usable for fine or vernier adjustment by the device.

A still further object resides in the provision of a manually actuatable control or adjusting device of the character indicated in which a single manually actuatable lever element is utilized to make both large and fine adjustments of the mechanism which is controlled or adjusted by the device.

Other objects and advantages will be more particularly set forth hereinafter or will become apparent as the description proceeds.

In the accompanying drawings, in which like reference numerals are used to designate similar parts throughout, there is illustrated a suitable mechanical embodiment for the purpose of disclosing the invention. The drawings, however, are for the purpose of illustration only and are not to be taken as limiting or restricting the invention, since it will be apparent to those skilled in the art that various changes in the illustrated embodiment may be resorted to without in any way exceeding the scope of the invention.

In the drawings,

Fig. 1 is a side-elevational view of a control device constructed according to the invention, a portion being broken away and shown in section to better illustrate the construction thereof, and Fig. 2 is a perspective exploded view of the various elements constituting the device, arranged in their proper order.

A device of the character indicated above may have a wide range of utility in the control of machinery where it is desirable to accomplish a very accurate setting of some machine control element. One use, for example, would be to operate the speed setting mechanism of a speed governor to select different governor settings. In such a case the governor, as indicated at 37, is usually provided with a speeder spring having a movable abutment at one end and mechanism such as a rack and pinion and a pinion shaft carrying a pulley or lever 35 for changing the position of the movable spring abutment. Such a governor is particularly illustrated and described in Patent No. 2,204,640 issued June 18, 1940, to Elmer E. Woodward, for governor mechanism. In such a case it is desirable to obtain a very fine and accurate adjustment of the speeder spring abutment in order to control the setting of the governor to exactly the desired speed. Various other uses for the device will readily occur to those skilled in the art.

In the accompanying drawings there is shown an arrangement of the device particularly adapted for the control of the speed governor which regulates the pitch of a controllable-pitch aeronautical propeller to maintain a constant speed operation of the propeller and the propeller driving engine. In this arrangement the governor control is mounted in the throttle control unit of an airplane. In this unit the manually operable throttle lever 10 is mounted on a shaft 12 fixed in a casing 14 secured to some portion of the aircraft convenient to the operator thereof. This throttle lever 10 projects beyond the shaft 12 to provide an apertured lever arm which pivotally receives one end of a link mechanism (not illustrated) operatively connected with the engine throttle (also not illustrated). The casing 14 may also carry a mixture control lever 16 also pivotally supported on the shaft 12 and extending beyond the shaft to provide an apertured lever arm for the reception of a pivoted link member (not illustrated) connected with the engine carburetor. A third lever member 18 may also be mounted on the shaft 12 and operatively associated with the mixture control mechanism. For the purpose of this disclosure the throttle lever and the mixture control mechanism may be of any conventional or desired form.

A governor control lever 20 is also mounted in the casing 14 and provided at one end with a knob or handle 22 for manual actuation and at its opposite end with an enlarged apertured portion 24 through which passes the shaft 12. The aperture in the portion 24 is dimensioned to provide a close fit for the lever on the shaft. A lever arm 26 projects downwardly from the shaft 12 and is provided in its lower end with apertures 28 and 30 one of which receives a pin or bolt 32 which provides a pivotal connection between the lever and a link member 34 which connects the lever 26 with the governor adjusting arm or pulley 35. This lever 26 is provided at its upper end with an apertured enlargement 36 the aperture of which surrounds a boss 38 provided on the back plate 40 of the casing 14 surrounding the aperture for the shaft 12. The aperture in the enlargement 36 is somewhat larger than the boss 38 to provide around the boss a space or clearance as is particularly indicated at 42 in Fig. 1.

The lever member 20 is secured to the member 26 above the shaft 12 by a pivotal connection including the bolt 44 and the apertured spacer 46. A third lever member 48 is apertured at its upper end to receive the shaft 12 and projects downwardly from the shaft parallel to the lever 26 and is pivotally secured at its lower end to the lever 26 by a suitable pivotal connection including the bolt 50 and apertured spacer 52. A friction plate 54 surrounds the shaft 12 between overlapping portions of the members 48 and 20 and a similar plate 56 surrounds the shaft between the lever 20 and the spacer 58 disposed between the governor control and the throttle mechanism. A plate member 59 rigidly secured to or integral with the shaft 12 is disposed between the boss 38 and the lever member 48. The friction plates 54 and 56 and the plate 59 are all provided with lateral extensions apertured at their outer ends to receive a through pin, not illustrated, passing through the casing 14 to hold these plates against rotation. A compressive force is applied to the entire assembly of levers and friction plates by means of a suitable disc spring 60 which is apertured to receive the end of the shaft 12 opposite the back plate 40 and is loaded by means of a nut 62 screw threaded onto the end of the shaft.

The operation of the device is substantially as follows:

When the lever 20 is moved it will move the bolt 44 and, through the pivotal connection provided by this bolt, will move the upper end of the lever 26. The lever 26 will then swing about the pivotal connection provided by the bolt 50 until the apertured portion thereof receiving the boss 38 comes in contact with the side of the boss at which time the lever 26 will turn about the axis of the shaft 12 rather than about the bolt 50. With the lever 26 turning about the shaft 12 the major adjustment of the control device, such as the governor setting arm 35, may be made, utilizing the relatively long lever arm between the shaft 12 and the aperture 30. Movement of the lever 20 is continued until the control device, such as the governor 37, is somewhat over adjusted. The lever is then moved slowly in the opposite direction to obtain the exact adjustment desired. When the lever is thus moved in the opposite direction the lever arm 26 will pivot about the bolt 50 since there will be a large clearance between the aperture provided in this arm and the corresponding side of the boss 38 and, by utilizing the relatively short lever arm between the bolt 50 and the aperture 30, and the leverage ratio of the length of the member 20 from the axis of shaft 12 to the axis of pivot 44, to the length of the member 26 from the axis of pivot 44 to the axis of pivot 50, which permits a relatively large movement of the handle 22 for a relatively small movement of the controlled instrumentality, a fine and accurate adjustment of the controlled device may be obtained. During this part of the adjustment the lever 48 is held against movement by its frictional engagement between the friction plate 54 and the adjacent side of the plate member 59 disposed between this lever member 48 and the boss 38. While this friction is sufficient to hold the lever arm 48 against movement while the arm 26 is turned about the bolt 50 as a pivot, it is not sufficient to materially interfere with movement of the lever arm 20 when the lever arm 26 is turned about the boss 38, at which time the arm 48 also turns about the shaft 12. This frictional engagement of the lever arm 48 and the frictional engagement of the arm 20 between the friction plates 54 and 56 provides a frictional securing means for the arms 20 and 26 so that they will remain in any adjusted position until manually moved to a different position.

If desired the arm 20 may be provided with a guide track in a quadrant 66 attached to the backing plate 40 of the control casing 14.

While a suitable mechanical embodiment has been hereinabove described and illustrated in the accompanying drawings for the purpose of disclosing the invention, it is to be understood that the invention is not limited to the particular arrangement so illustrated and described, but that such changes in the size, shape and arrangement of the various parts may be resorted to as come within the scope of the subjoined claims.

Having now described the invention so that others skilled in the art may clearly understand the same, what it is desired to secure by Letters Patent is as follows:

1. In a manually operable adjusting mechanism capable of providing different leverages for moving an adjustable device, a manually movable lever, an element operatively connected with said adjustable device for moving the same, a connection between said lever and said element, abutment means providing a pivot for said element about which said element is movable by said lever for moving said device a large distance for a given movement of said lever, and means rendered effective by friction operatively connected with said element providing a pivot about which said element may swing to provide a leverage for moving said device a small distance for the same given movement of said lever within the limits of movement of said element prior to engagement thereof with said abutment means.

2. In a manually operable adjusting mechanism capable of imparting to an adjustable device a relatively rapid movement for coarse adjustment and a relatively slow movement for fine adjustment, a manually movable lever, an element operatively connected with said adjustable device for moving the same, means operatively connecting said lever with said element, said element having two fulcrums, one of said fulcrums having a lost-motion association with said element, and frictionally held means supporting the other of said fulcrums for rendering said second fulcrum effective within the limits of the lost-motion between said one fulcrum and the element.

3. A manually operable mechanism for moving an adjustable device comprising, a manually movable lever supported on a fixed pivot, and means operatively connecting said lever with said adjustable device including a lost-motion device, said connecting means providing a leverage of a predetermined ratio between said lever and said adjustable device, and a friction device operative within the limits of play of said lost-motion device providing a fulcrum to give said connecting means a leverage of a ratio higher than said predetermined ratio between said lever and said adjustable device.

4. A manually operable mechanism for moving an adjustable device comprising, a manually movable lever supported on a fixed pivot, and means connecting said lever with said adjustable device including a second lever movable into pivotal engagement with an abutment, a pivotal connection between one end of said second lever and said manually movable lever, a linkage connecting the opposite end of said second lever with said adjustable device, and frictionally held means providing a second pivot for said second lever located between said fixed pivot and the linkage attached end of said second lever and effective within the limits of movement of said lever prior to its engagement with said abutment.

5. A manually operable mechanism for moving an adjustable device comprising, a manually movable lever supported on a relatively fixed shaft, and means connecting said lever with said adjustable device including, a second lever having spaced portions thereof disposed on opposite sides of said shaft and spaced apart a greater distance than the diameter of said shaft, a pivotal connection between said manually movable lever and one end of said second lever, a linkage connection between the opposite end of said second lever and said adjustable device, a third lever mounted on said shaft, frictional means resisting turning movements of said third lever about said shaft, and a pivotal connection between said second lever and the end of said third lever opposite the shaft supported end thereof.

6. A control including a manually operable pivoted lever, means providing different ratios of movement, connecting said lever with an element to be controlled, said means including a frictionally held device forming a portion of a motion transmitting connection between said lever and said element to be controlled to move said element at one rate relative to said lever, said means also including abutment means engageable by an element of said connection permitting the transmission of motion from said lever to said element at a different rate and rendering said friction device ineffective.

7. A control mechanism comprising a manually operable pivoted lever, an element to be controlled, a member connected with said lever and said element and movable by said lever for moving said element, a device held in position by friction and pivotally connected with said member and while being held establishing one ratio of movement of said lever relative to said element, and an abutment for said member for establishing another ratio of movement of said lever relative to said element when said member is moved into contact with said abutment.

8. A control comprising, an element to be controlled, a two part lever movable as a unit about a fixed pivot, said two parts being movable relative to each other, fixed abutment means for one part limiting the extent of said relative movement, said one part being connected with said element, and frictionally held means providing a temporary pivot for said one part when said one part is not in contact with said fixed abutment means.

9. In a manually operable adjusting mechanism capable of providing different leverages for moving an adjustable device, a lever manually operable about a fixed pivot, a lever element operatively connected at spaced points along its length with said lever and with the adjustable device respectively, said element having a movable pivot located intermediate its ends, means normally restraining the movement of said movable pivot, and abutment means engageable with said element at a point spaced from said movable pivot and constituting fixed pivot means for said element whenever the latter is in engagement therewith.

10. In a manually operable adjusting mechanism capable of providing different leverages for moving an adjustable device, a lever element operatively connected adjacent one of its ends with the adjustable device, a plurality of pivots for said element located at different distances from said one end, one of said pivots comprising a movable pivot and another comprising fixed abutment means disposed in the path of said lever, frictional means controlling the movement of said movable pivot, and a lever manually operable about a fixed pivot having an operative connection with said element at a point thereon remote from both of said pivots.

11. In a manually operable adjusting mechanism capable of providing different leverages for moving an adjustable device, a lever element operatively connected adjacent one of its ends with the adjustable device, a plurality of pivots for said element located at different distances from said one end, one of said pivots comprising a movable pivot and another comprising spaced fixed abutment means selectively engageable with said element upon movement of the latter in opposite directions, frictional means controlling the movement of said movable pivot and holding the latter fixed during movement of said element between said abutment means, and a lever manually operable about a fixed pivot having an operative connection with said element at a point thereon remote from both of said pivots.

12. In a manually operable mechanism capable of providing different leverages for moving an adjustable device, a shaft, a manually operable lever having a fixed pivot on said shaft, an element operatively connected adjacent one of its ends with the adjustable device and operatively connected adjacent its other end with said lever at a point spaced from the pivot of the latter, a movable pivot for said element between the ends thereof, means normally restraining the movement of said movable pivot, and fixed abutment means engageable by said element as the latter is moved by said lever in opposite directions about said movable pivot and about which said element pivots following such engagement.

13. In a manually operable mechanism capable of providing different leverages for moving an adjustable device, a shaft, a manually operable lever having a fixed pivot on said shaft, a lever element having an operative connection below said shaft with the adjustable device and having an operative connection above said shaft with said lever, said element having an aperture through which said shaft passes loosely, a movable pivot for said element below said shaft, and means for moving said element about said movable pivot during relative movement between said shaft and the side wall of said aperture, and about the point of engagement of said shaft and side wall following such engagement, including means for restraining said movable pivot from movement prior to said engagement while permitting movement of said pivot by said element following such engagement.

JAMES M. SHOEMAKER.